May 15, 1956     A. GOMES     2,745,616
JAR HOLDER

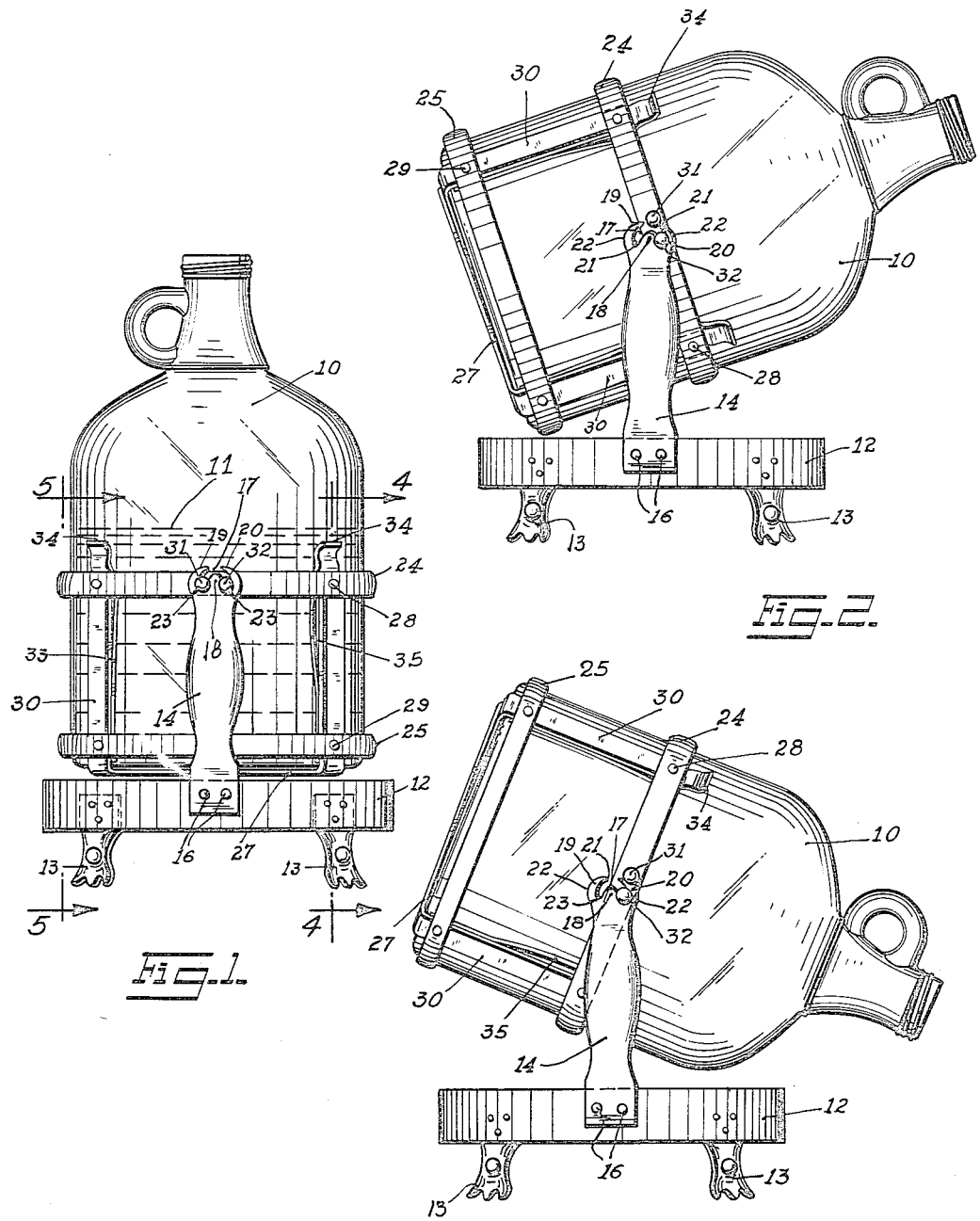

Filed July 6, 1953         2 Sheets-Sheet 2

INVENTOR.
ALVIRO GOMES
BY
ATTORNEY

United States Patent Office 2,745,616
Patented May 15, 1956

2,745,616

JAR HOLDER

Alviro Gomes, Jamaica, N. Y.

Application July 6, 1953, Serial No. 366,315

1 Claim. (Cl. 248—138)

This invention relates to new and useful improvements in a holder or support for a jar, bottle or like vessel containing liquid.

The principal object of the present invention is to provide a device for supporting or holding a jar, bottle, demijohn or like vessel for holding liquid in such a manner that the vessel is securely held in position against accidental displacement on a base and when it is desired to pour out the contents of the vessel into a glass or other receptacle then the vessel can be readily tilted for discharging the contents with little physical exertion on the part of the operator.

Another object of the invention is to provide a holder or support for a large jar, bottle or like vessel containing liquid which may be readily tilted so as to discharge all or a portion of the contents of the vessel.

A further object of the invention is to provide a holder or support of this character which may be tilted in opposed directions without danger of tipping over and which automatically returns to normal upright position.

Still another object of the invention is to provide a holder or support for securely holding various size glass vessels containing liquid, without danger of breaking the vessel.

Yet another object of the invention is to provide a holder or support for a large jar, bottle or like vessel containing liquid which is portable and sanitary.

It is further proposed to construct a holder or support for a large jar, bottle or like vessel which is simple and rugged in construction and which can be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a side elevational view of a holder embodying the invention with a bottle in supported upright position therein.

Fig. 2 is a similar view showing the bottle in partially tilted position, in one direction.

Fig. 3 is a similar view showing the bottle in fully tilted position.

Figure 4:
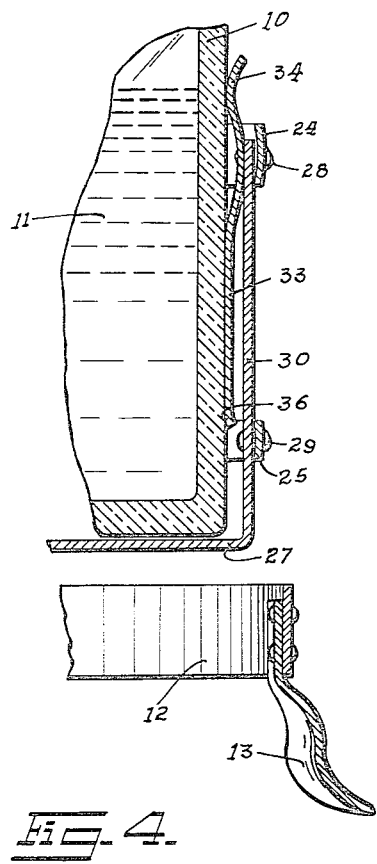
Fig. 4 is an enlarged vertical sectional view taken on the plane of the line 4—4 of Fig. 1.
Figure 5:
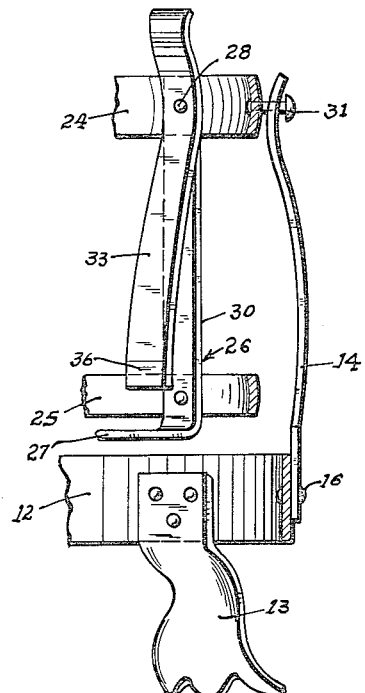
Fig. 5 is an enlarged vertical sectional view taken on the plane of the line 5—5 of Fig. 1.
Figure 6:
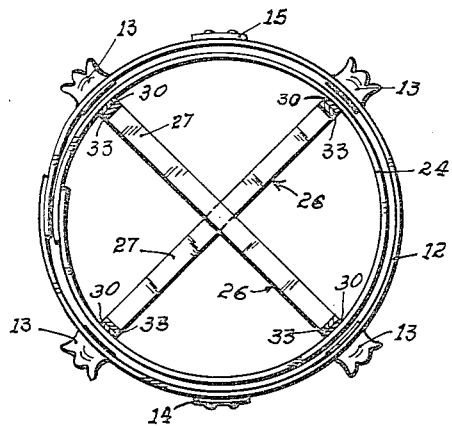
Fig. 6 is a top plan view of the holder with the bottle removed.

Referring to the drawings in detail, in Fig. 1 a large glass jar or bottle 10 containing liquid 11 is shown supported in upright position. According to the present invention, the support includes an annular base 12 riveted to supporting feet 13. A pair of opposed bars or standards 14 and 15 extend upwardly from the base, the bottom ends of the standards being fastened to the base by rivets 16. The upper end of each standard is provided with a slotted portion 17 forming a central curved stud 18 and curved nose portions 19 and 20 on opposite sides of the stud. Each nose portion is formed with inner and outer curved camming faces 21 and 22, respectively, the inner camming faces 21 leading to a seat 23 in the lower end of the slotted portion, on one side of the stud. It will be noted that the seats 23 are located off or away from the center of each standard.

The standards 14 support a movable frame comprising upper and lower rings or bands 24 and 25, respectively, connected by U-shaped flat bars 26 disposed at right angles to each other, with their horizontal portions 27 crossing each other at a point below the lower ring 25 and serving as a seat for the supported bottle 10. The U-shaped bars are fastened to the upper and lower rings 24 and 25 by rivets 28 and 29, respectively, passing through the vertical portions 30 of said bars. A pair of spaced headed trunnion pins 31 and 32 extend laterally from opposite sides of the upper ring 24 and project through the slotted portions 17 in the top ends of the standards 14 with their shank portions seated on the seats 23 and with their heads positioned outwardly thereof, said heads being larger in diameter than the diameter of the seats so as to prevent longitudinal displacement of the pins.

An elongated flat spring finger 33, of compound curvature, is arranged along the inner surface of the vertical portion 30 of each U-shaped bar 26. Each finger 33 is secured adjacent its upper end to the upper ring 24 by the rivets 28 fastening the adjacent U-shaped bar 26. The extreme unattached end 34 of the finger projects above the upper ring 24 and curves inwardly beyond said ring. The intermediate portion 35 of the finger curves inwardly and its lower end 36 is unattached.

It will be noted that the movable frame is supported in upright position by the standards 14 and pins 31 and 32, with its bottom end spaced above the top of the base 12 leaving sufficient clearance for the frame with the bottle 10 therein to swing across the top of the base. When the frame is thus supported in upright position, it cannot be lifted off of the standards 14 as the nose portions 19 and 20 act as stops against upward movement of the trunnion pins 31 and 32.

When it is desired to pour out the contents of the bottle 10, the operator swings the frame with the bottle therein in one direction, around one set of pins, for example, around the pins 32, downwardly to the position shown in Fig. 2, so that a portion of the contents may be discharged. During this tilting or swinging movement, the other set of pins 31 will be carried upwardly along the inner camming faces 21 of nose portions 20 and outwardly of the slotted portions 17 of the standard, as shown in Fig. 2. If such tilting movement is continued further to the position of Fig. 3, the entire contents may be discharged. During this continued movement, the released pins 31 will ride over the outer camming faces 22 of the nose portions 21 into interlocking relation with said camming face thereby preventing accidental displacement of the frame.

The bottle 10 is securely held in the frame due to the intermediate curved portions 35 and the top curved ends 34 of the spring fingers 33 gripping the bottle.

To reset the frame with its bottle, the frame is tilted backwardly beyond its center of gravity at which point the weight of the frame and bottle will cause them to return by gravity to upright position, the released pins 31 riding downwardly along the inner camming faces 21 of the nose portions 20 to their seats 23 in the slotted portions 17 of the standards. The eccentrically disposed seats will cause the frame with the bottle to be held in truly vertical position.

Figure 7:
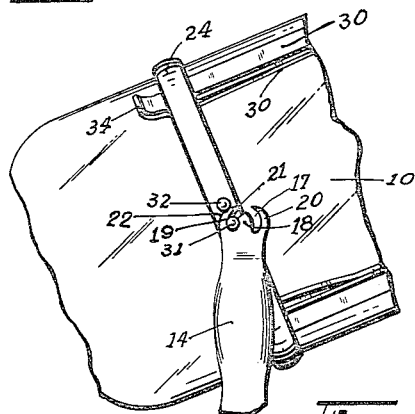
Fig. 7 is a fragmentary view similar to Fig. 2 but showing the bottle partially tilted in the opposite direction.

If the frame with the bottle is tilted in the opposite direction, it will pivot around the trunnion pins 31 and the pins 32 will be carried upwardly along the inner camming faces 21 of nose portions 29 and outwardly of the slotted portions 17 of the standards as shown in Fig. 7. The pins 32 will then function the same as the pins 31 when said latter pins were released.

It will be understood that the frame may be readily placed in the standards by first inserting one pin of each pair of trunnion pins into the slotted portions 17 of the standards and then swinging the frame around the inserted pins as a pivot bringing the other set of trunnion pins into the slotted portions. When it is desired to remove the frame from the base, it is only necessary to tilt the frame sufficiently to carry one set of trunnion pins clear of the slotted portions of the standards and lift the other pair of trunnion pins clear of the standards.

While I have illustrated and described the preferred embodiment of my invention, it is to be understood that I do not limit myself to the precise construction herein disclosed and the right is reserved to all changes and modifications coming within the scope of the invention as defined in the appended claim.

Having thus described my invention, what I claim as new, and desire to secure by United States Letters Patent is:

A holder for a bottle or the like comprising an annular base, opposed standards on the base along the center thereof, and being formed with slotted portions at their outer ends providing central studs in said slotted portions, nose portions at the sides of the slotted portions, said nose portions having camming inner and outer faces and seats formed in the slotted portions at the inner ends of the inner camming faces of the nose portions, a frame tiltably mounted on said standards including upper and lower rings, U-shaped bars connecting said rings with their horizontal portions crossing to form a seat for a bottle inserted in the frame, pairs of closely spaced trunnion pins carried by the outer ring and seated in the seats in the slotted portions, and elongated spring fingers secured to said outer ring adjacent their outer ends, the remaining portions of said fingers being unattached and curving inwardly of the rings along the U-shaped bars for gripping a bottle inserted in the frame, said pins being adapted to coact with the camming faces on said nose portions upon swinging movement of the frame, for limiting such swinging movement.

References Cited in the file of this patent
UNITED STATES PATENTS

| Number | Name | Date |
|---|---|---|
| 123,379 | Clark | Feb. 6, 1872 |
| 216,932 | Bean | July 1, 1879 |
| 437,455 | Robbins | Sept. 30, 1890 |
| 763,855 | Charlebois | June 28, 1904 |
| 899,031 | Davis | Sept. 22, 1908 |
| 2,116,576 | Hormann | May 10, 1938 |
| 2,470,154 | Fitzgerald | May 17, 1949 |